Dec. 2, 1941.   W. R. KOCH   2,264,850
RECEIVING SYSTEM
Filed Sept. 29, 1939   2 Sheets-Sheet 1
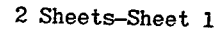
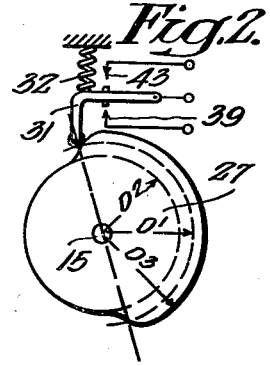
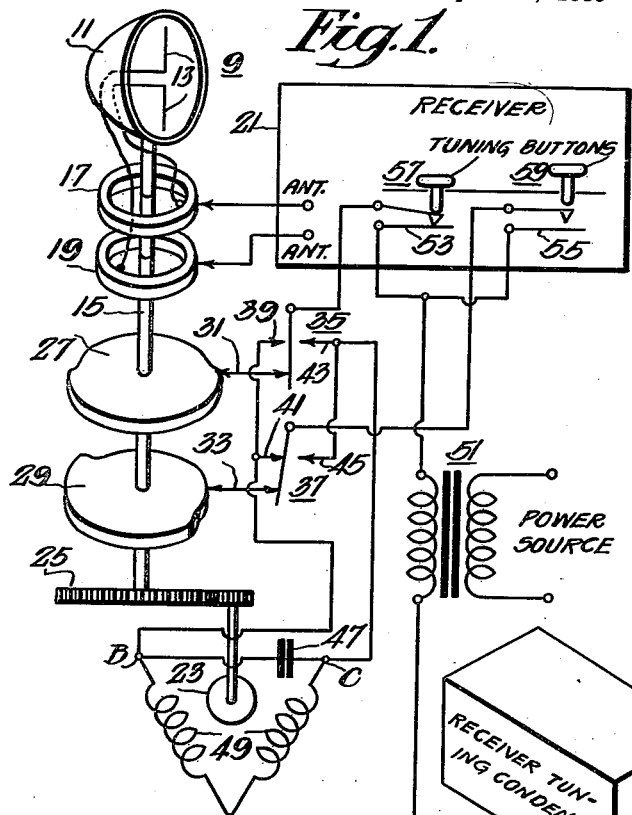
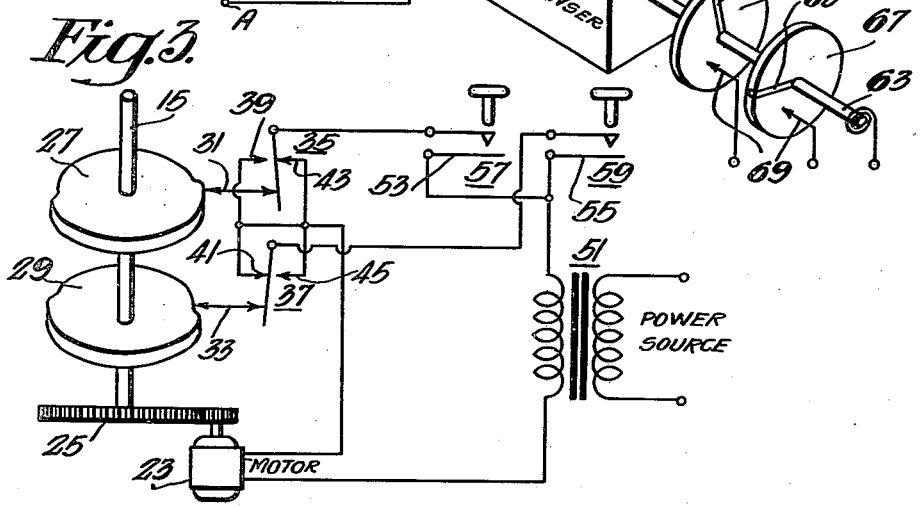
Inventor
Winfield R. Koch
By
Attorney

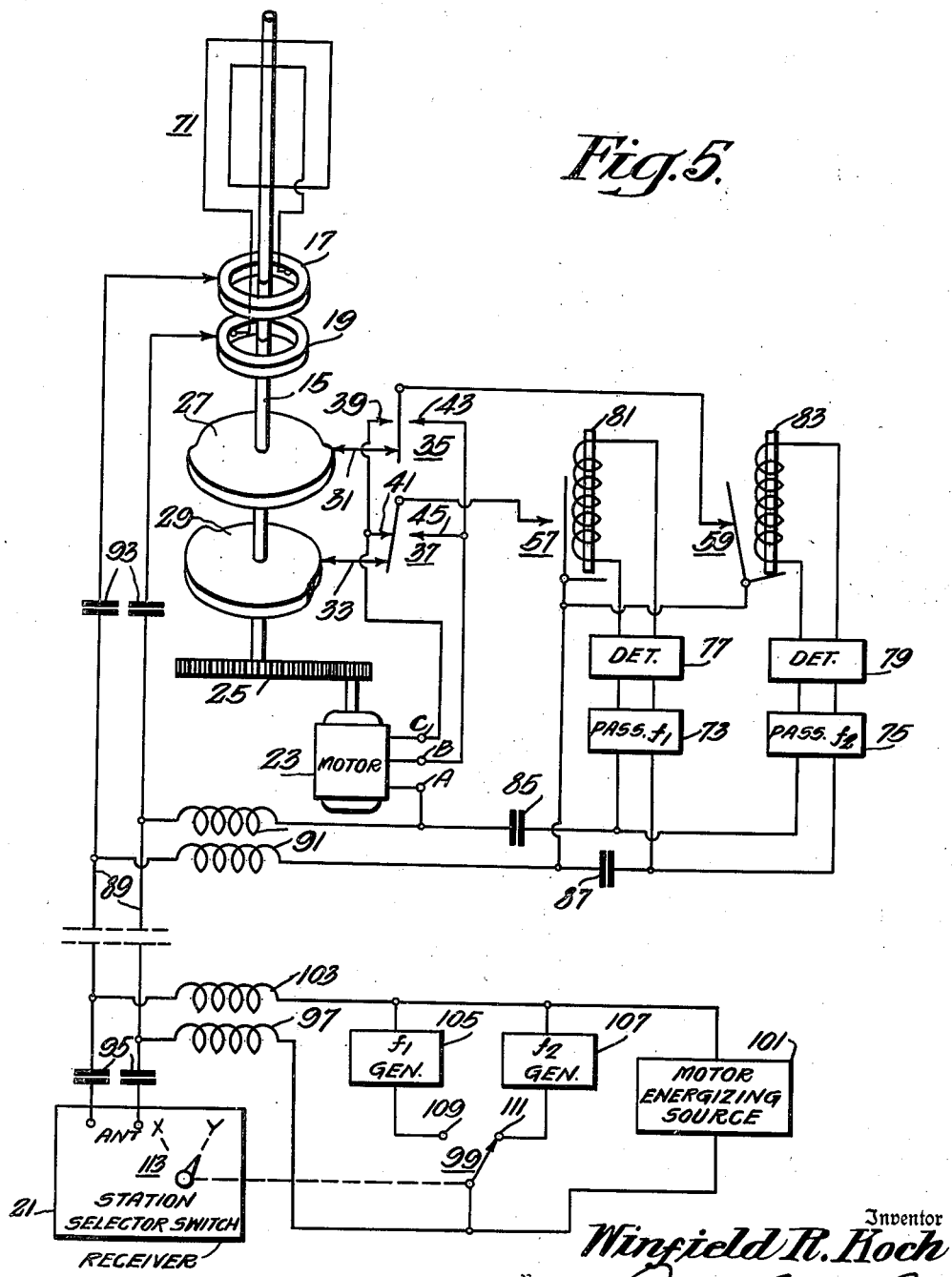

Patented Dec. 2, 1941

2,264,850

UNITED STATES PATENT OFFICE 2,264,850

RECEIVING SYSTEM

Winfield R. Koch, Haddonfield, N. J., assignor to Radio Corporation of America, a corporation of Delaware Application September 29, 1939, Serial No. 297,075

9 Claims. (Cl. 250—11)

This invention relates to receiving systems, more particularly to a receiving system employing a directional aerial the position of which is automatically adjusted by a mechanism controlled by the receiver station selector.

I am aware of systems in which a motor is used to cause the rotation of a directional aerial. For example, in the so-called "self-orienting compass," a loop antenna is automatically maintained in a predetermined relation to a particular transmitter. However, it is frequently desirable to orient a directional aerial to any one of a plurality of predetermined positions which may depend upon the direction of reception at any moment. The reason for the necessity of such a system is particularly apparent in connection with the reception of ultra high frequency signals. Television receivers, for example, are frequently found to have "ghost" images which are caused by reflections from nearby buildings or the like. By employing a fixed directional aerial which has one or more points of minimum response, a "ghost" signal from one transmitter may be effectively eliminated, but the aerial cannot be adjusted to provide the best reception from any one of a number of transmitters. Since best reception is achieved when the receiving aerial is located at a considerable height above ground, and is consequently some distance from the receiver, it is impractical to attempt to manually adjust the position of the aerial each time the receiver is tuned to a different transmitter.

In accordance with this invention, a motor control mechanism is operatively connected to the station selector of a receiver which operates a motor and causes the aerial to assume a predetermined position for each position of the station selector. One embodiment of this invention shows such a control circuit utilizing direct connections between the control mechanism at the receiver and the motor mechanism at the aerial. A preferred embodiment utilizes only the lead-in transmission line to effectuate the control operation.

The principal object of this invention is to provide means for adjusting the position of a remote directional aerial to certain preset positions which correspond respectively to various tuning frequencies. Other objects of this invention include the provision of means for the automatic adjustment of the position of a directional aerial to provide the best possible reception on each of any desired number of frequencies; to provide means for adjusting a directional aerial to any one of a number of desired predetermined positions; and to utilize the lead-in transmission line as the control circuit conductor for such a system.

This invention will be better understood from the following description when considered in connection with the accompanying drawings, and its scope is indicated by the appended claims. Referring to the drawings, Figure 1 is a circuit diagram of an embodiment of this invention; Figure 2 is an enlarged view of a cam mechanism used in connection with the aerial control circuit; Figure 3 is a circuit diagram of a simplified embodiment of this invention; Figure 4 is a perspective view of a control mechanism; and Figure 5 is a schematic drawing of a preferred embodiment of this invention. Similar reference numerals refer to similar parts throughout the several drawings.

Referring to Fig. 1, 9 is a direct aerial which may include, for example, a parabolic reflector 11 and dipole receiving elements 13. The directive aerial is mounted on a shaft 15 for rotation about a vertical axis. A pair of slip rings 17 and 19 provide a connection between the aerial and a receiver 21, and permit the free rotation of the aerial. The shaft 15 is rotated by a motor 23 through a gear mechanism 25.

The illustrated system may, of course, be used with any number of control circuits to provide a like number of aerial positions. In order to simplify the drawings, however, only two control circuits have been illustrated. A pair of cams 27 and 29 are adjustably mounted on the supporting shaft 15. In operative relation to the cams are cam followers 31 and 33, respectively, which, in turn, control the position of a pair of single - pole double - throw motor controlling switches 35 and 37. Corresponding contact points 39 and 41 of the motor controlling switches are connected to terminal B of the field winding of reversible motor 23. The other corresponding contact points 43 and 45 of the motor controlling switches are connected to terminal C of the motor field windings. A phasing reactor 47 is connected between terminals B and C. Terminal A is common to the two sections of the field winding 49 and is connected to one terminal of a power source, such as a transformer 51, or the like. The remaining terminal of the source is connected to corresponding contact arms 53, 55 of a series of control switches 57, 59, which are located in or near the receiver 21. The remaining contacts of control switches 57 and 59 are connected respectively to the movable arms of the motor control switches 35 and 37.

Before describing the operation of this embodiment of my invention, the construction of the cams 27 and 29 will be explained. Referring to Fig. 2, it will be seen that the cam follower 31 is held against the outer circumference of the cam 27 by a spring bias 32, or the like, so that its position in a radial direction is determined by the angular position of the cam. There are three positions which may be assumed by the cam follower. The first or neutral position is illustrated, and it is seen that the switch arm is not in contact with either contact point 39 or 43. At the neutral point, the effective cam diameter is D1. Upon clockwise rotation of the cam, its effective diameter decreases to D2, while, upon counter-clockwise rotation, its effective diameter increases to D3. Rotation causes the motor controlling switch arm to contact one or the other of the contact points 39 and 43.

Referring again to Fig. 1, it will be seen that energizing current is applied to the motor 23 when either one of the switches 57, 59 is closed and when the corresponding one of the motor controlling switches is making contact. Assuming that the operator closes switch 57, as illustrated, and that the aerial is in an initial position which causes the movable arm of switch 35 to touch contact point 43, the motor will be energized and will rotate in such a direction that the cam 27 is rotated in a clockwise direction, viewed from the top, until the neutral position is reached, at which point the motor circuit will be interrupted and the rotation of the aerial will stop. The motor speed is preferably low enough to prevent the aerial from rotating beyond the neutral position after the motor has been shut off. If, on the other hand, the initial position of the aerial is such that the movable arm of switch 35 is touching contact point 39, the motor will turn in the reverse direction, which will rotate the cam 27 in a counter-clockwise direction and again return the switch to the same neutral position. It is seen, therefore, that, when the circuit is closed to one of the motor-controlling switches, the aerial will immediately rotate to a predetermined position which is determined by the cam associated with that switch. By suitably adjusting the various cams on the shaft, any desired predetermined position of the aerial may be obtained by closing the corresponding switch.

While the aerial control mechanism described may be controlled by a separate group of switches, in order to achieve automatic orientation, I propose to combine the control switches with the receiver tuning mechanism. For example, in a push-button receiver of the type commonly employed, extra contacts may be added to the push-button switches so that automatic orientation of the aerial is achieved without further attention on the part of the operator. The system may also be used in conjunction with conventional receivers using variable condensers for tuning purposes. Such a system is illustrated in Fig. 4, to which reference is now made. Reference numeral 61 represents the tuning condenser of a receiver. Coupled to the shaft of this condenser is a rotatable shaft 63 on which are mounted a number of insulating discs 65, 67. Each disc contains a conductive element 68 which is adapted to contact a slidable connector 69 when the condenser has been rotated to such a position as to bring the two into alignment. The shaft 63 is the common terminal of the switch, to which connection may be made through a flexible connection or the like. This arrangement provides any desired number of single pole contact switches which are connected in circuit in the manner illustrated with respect to the switches 57 and 59. When the receiver is tuned to particular stations, therefore, the motor-control circuits will be energized and the aerial rotated to a predetermined position in the manner described with respect to Fig. 1.

The arrangement illustrated in Fig. 1 is particularly adapted for use with a unidirectional aerial such as that illustrated. In many instances, however, a loop antenna having a bi-directional characteristic is satisfactory. In such a case, the loop antenna may take either one of two positions which are 180° apart without affecting its operation. It is not necessary, therefore, to utilize a reversible motor of the type illustrated in Fig. 1, but a simple motor may be used which rotates the antenna in a given direction until one or the other of the two neutral points on the cam are brought into alignment with the cam follower. In Fig. 3, the movable arms of the motor-controlling switches 35 and 37 are connected in the same manner as the switches in Fig. 1. All the fixed contacts 39, 41, 43 and 45, however, are connected to the motor 23, which may be an A. C. or a D. C. motor, as desired.

One disadvantage of the control system illustrated in Fig. 1 is that it is necessary to provide a conductive circuit from each control switch to the aerial. As a result, it is necessary to run a number of wires in addition to the lead-in conductor from the aerial to the receiver.

A preferred embodiment of this invention, illustrated in Fig. 5, eliminates the necessity for running auxiliary conductors to the aerial. As before, a rotatable directional aerial 71 is mounted on a shaft 15 which may be rotated about a vertical axis by a reversible motor 23. Cams 27, 29 are employed to actuate the motor-controlling switches 35 and 37. The control switches, however, are remotely operated through a frequency-selective relay system which includes bandpass filters 73 and 75, detectors 77 and 79, and relay mechanisms 81 and 83. The bandpass filters are coupled through radio frequency blocking capacitors 85 and 87 to the lead-in conductor 89. Radio frequency choke coils 91 may also be connected in series with the blocking capacitors to prevent the loss of energy from the transmission line. Current for energizing the motor is also transmitted over the lead-in conductors. The motor-energizing current may be either direct current or an alternating current of a low frequency. Audio frequency blocking capacitors 93 are connected in series with the lead-in conductors between the aerial 71 and the point to which the radio frequency choke coils are connected.

At the receiver end of the transmission line, a receiver 21 is coupled to the line through a pair of audio frequency blocking capacitors 95. One conductor of the transmission line is connected through a radio frequency choke coil 97 to the movable arm of a selector switch 99 and to one terminal of a source of motor-energizing current 101. The other transmission line conductor is connected through a radio frequency choke coil 103 to the remaining terminal of the source of the motor-energizing current 101, and to one terminal of a number of relay control-current generators 105 and 107. The remaining terminals of the relay current generators are connected, respectively, to the contact points 109, 111 of the control switch 99. As pointed out above, the control switch 99 may be operatively connected to the station selector switch 113 of the receiver 21; may comprise an arrangement of the type illustrated in Fig. 4; or may be separately operated.

The two relay current generators provide controlling currents of different frequencies, preferably in the audio or supersonic range. The frequencies generated correspond, respectively, to the frequencies passed by the two filters 73, 75, which are included in the selective system used to control the motor 23. While two separate generators may be utilized, in practice the system would probably comprise a single generator with switching means for changing its frequency.

The operation of the device illustrated in Fig. 5 will now be described. When the station selector switch 113 is placed in a position Y to receive signals from a transmitter, the control switch 99 is brought into contact with contact point 111, thus impressing currents of a frequency $f2$ across the transmission line 89. These currents are prevented from entering the receiver by capacitors 95, and are impressed on the selective networks 73 and 75, the latter of which passes the control current to detector 79, which in turn operates relay 83. The closing of switch 59 applies the motor-energizing current to motor-controlling switch 35, which in turn sets the motor 23 in operation so as to rotate the loop 71 to a predetermined position. When a different transmitter is selected by placing the switch 113 in position X, a similar sequence of events takes place, the control current frequency $f1$ being passed by the filter 73 to operate relay 81.

I claim as my invention:

1. A receiving system comprising a rotatable directional aerial, a plurality of cams rotatable with said aerial, a motor for rotating said aerial, motor controlling switches operatively connected to said cams and having "off" and "on" positions, said motor causing said aerial and said cams to rotate until a selected one of said controlling switches reaches its "off" position, a receiver coupled to said aerial through a transmission line, said receiver having station selecting means, and means responsive to the operation of said station selecting means for applying controlling currents to said transmission line to operate one of said controlling switches, so that said aerial assumes a predetermined position for each position of said station selector.

2. A receiving system comprising a rotatable unidirectional aerial, a transmission line, a receiver connected to said aerial through said transmission line, said receiver having station selector means, a plurality of cams rotatable with said aerial, a reversible motor for rotating said aerial, a plurality of reversing switches operated by respective cams to cause said motor to rotate said aerial, and said cams in a direction determined by their initial position to a given neutral position, and means operatively connected through said transmission line with said station selector means for making all but one of said reversing switches inoperative whereby said aerial is made to assume a predetermined position suitable for the reception of the station selected by said station selector means.

3. A receiving system comprising a rotatable directional aerial, means for rotating said aerial to predetermined positions, a receiver having station selector means, a transmission line coupling said aerial to said receiver, means including said transmission line for applying energizing currents to said rotating means, selective control means in circuit with said rotating means for determining the position of said aerial, and means operatively connected to said station selector means for actuating said control means.

4. A receiving system comprising a rotatable directional aerial, means for rotating said aerial, a receiver remote from said aerial and connected thereto by a transmission line, means including said transmission line for applying energizing currents to said rotating means, control means in circuit with said rotating means for determining the position of said aerial, and means for actuating said control means to rotate said aerial to predetermined positions.

5. A receiving system comprising a rotatable directional aerial, means for rotating said aerial, a receiver remote from said aerial and connected thereto by a transmission line, means including said transmission line for applying energizing currents to said rotating means, frequency responsive selective relay means energized through said transmission line for determining the position of said aerial, and control means for actuating a desired one of said relays to cause said aerial to rotate to a desired predetermined position.

6. A receiving system comprising a rotatable directional aerial, a motor for rotating said aerial, a plurality of cams rotatable with said aerial, said cams being operatively connected to motor controlling switches, said cams having "off" positions which open the circuit of said motor at predetermined positions of said aerial, a frequency selective relay switch in circuit with each of said motor controlling switches, a receiver having station selector means, a transmission line coupling said receiver to said aerial, and means for transmitting control currents of selectable frequencies over said transmission line to operate a desired one of said frequency selective relay switches and cause said aerial to rotate to one of said predetermined positions.

7. A receiving system comprising a rotatable directional aerial, a receiver remote from said aerial and having station selector means, a transmission line coupling said aerial to said receiver, motor means connected to said aerial, means for passing energizing currents for said motor through said transmission line, and means responsive to the operation of said station selector means for operating said motor to rotate said aerial to predetermined positions.

8. A receiving system comprising an adjustable aerial, a receiver remote from said aerial and having station selector means, a transmission line coupling said aerial to said receiver, adjusting means including a motor connected to said aerial for adjusting said aerial to selectable positions, means for passing energizing currents for said motor through said transmission line, frequency selective relays for controlling the operation of said motor, and means responsive to the operation of said station selector means for operating one of said frequency selective relays.

9. A receiving system comprising a rotatable directional aerial, a plurality of cams rotatable with said aerial, motor control means operated by said cams, a receiver having station selector means, a transmission line coupling said receiver to said aerial, a motor for rotating said aerial, means for energizing said motor through said transmission line and said motor control means, and switching means operatively connected to said station selector means for controlling said energizing means so that said aerial is rotated to a predetermined azimuth for each position of said station selector means.

WINFIELD R. KOCH.